April 18, 1961     R. BELLINGER     2,980,221
APPARATUS FOR TURNING AND RADIUSING AN ADJUSTABLE CHUTE
Filed Nov. 13, 1957     11 Sheets-Sheet 1

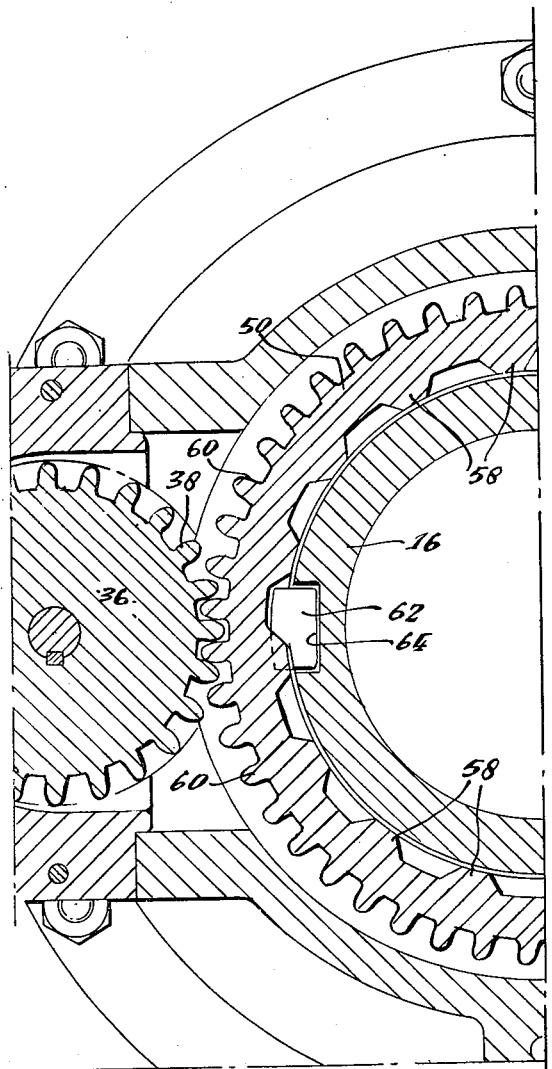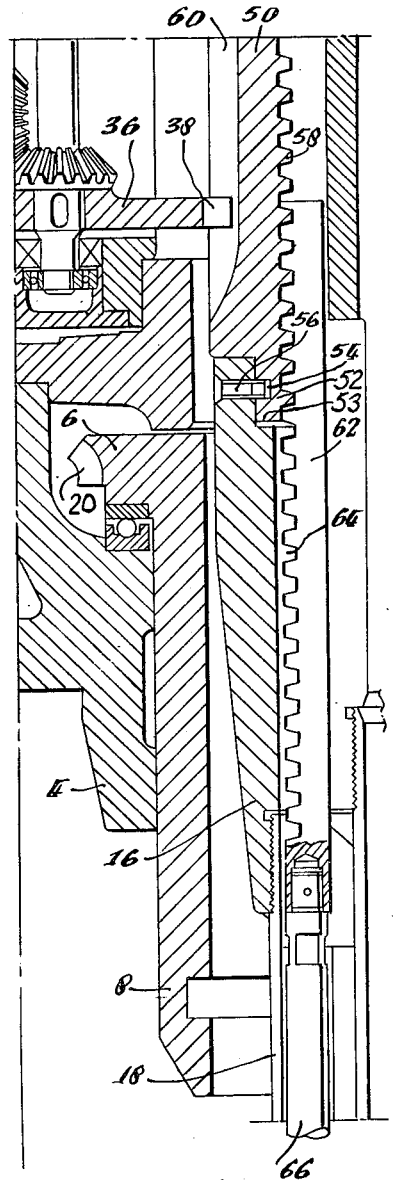

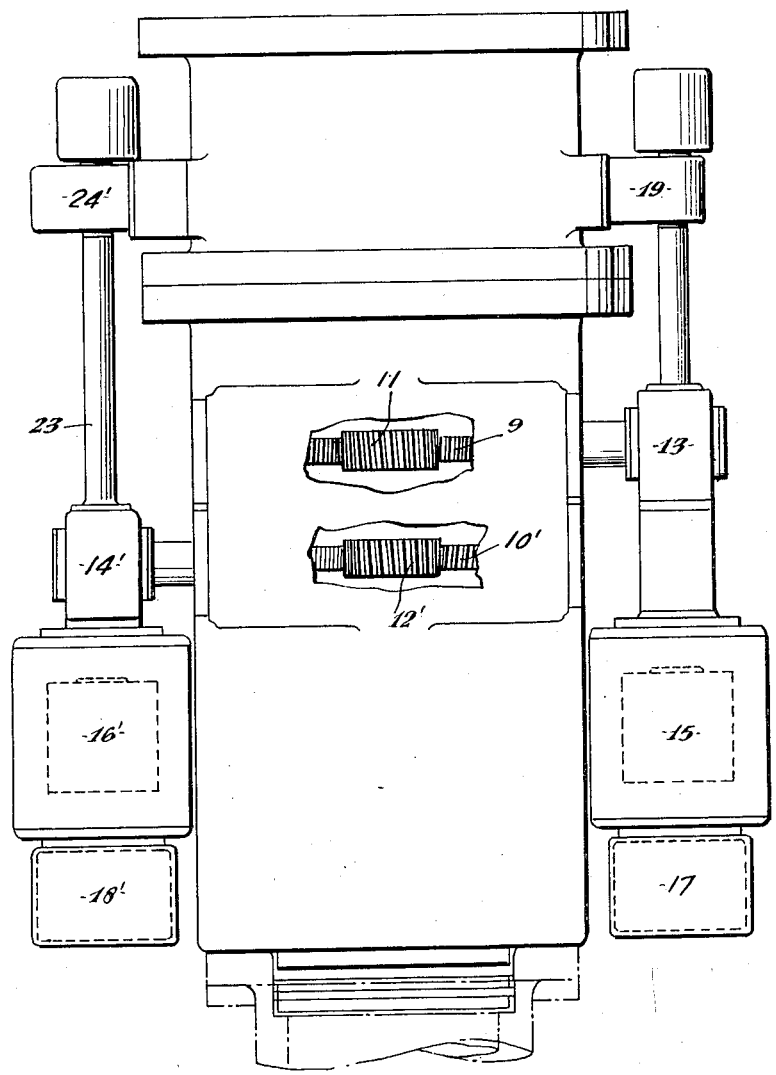

April 18, 1961 R. BELLINGER 2,980,221
APPARATUS FOR TURNING AND RADIUSING AN ADJUSTABLE CHUTE
Filed Nov. 13, 1957 11 Sheets-Sheet 6
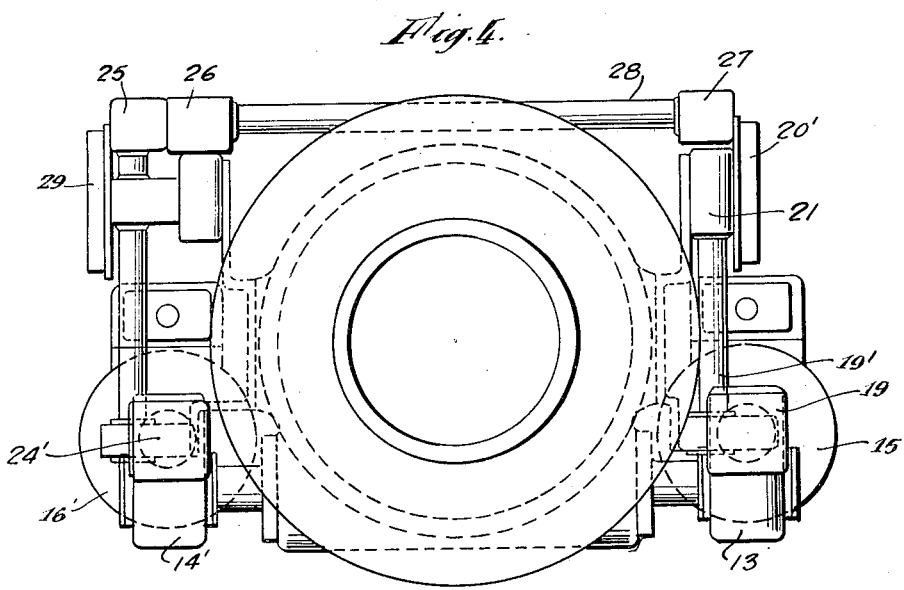
Fig.4.
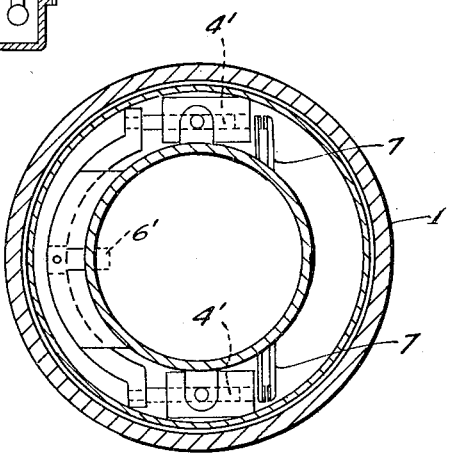
Fig.7
Fig.8.

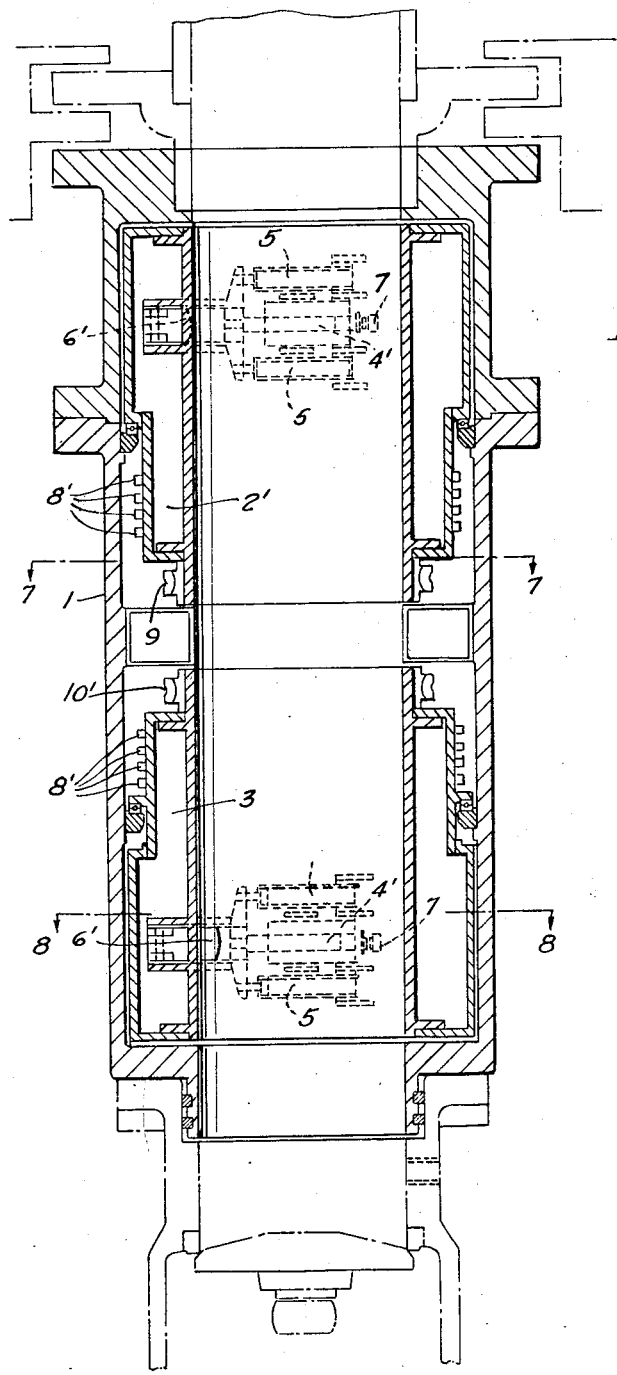

April 18, 1961 R. BELLINGER 2,980,221
APPARATUS FOR TURNING AND RADIUSING AN ADJUSTABLE CHUTE
Filed Nov. 13, 1957 11 Sheets-Sheet 10

United States Patent Office 2,980,221
Patented Apr. 18, 1961

2,980,221

APPARATUS FOR TURNING AND RADIUSING AN ADJUSTABLE CHUTE

Ronald Bellinger, Bristol, England, assignor to Strachan & Henshaw Limited, Bristol, England, a company of Great Britain and Northern Ireland Filed Nov. 13, 1957, Ser. No. 696,221

Claims priority, application Great Britain Nov. 15, 1956

8 Claims. (Cl. 193—30)

This invention relates to apparatus for turning and radiusing an adjustable chute of the kind adapted to be adjusted by turning and having a movable part to be radiused to bring it into register with any one of a number of channels. One of the purposes for which such turning and radiusing of a chute is required is for the servicing of several selected channels of a heterogeneous nuclear reactor. The cellular construction of a reactor is well known, and it is, of course, to be understood that the chute has to service a large number of channels in the heterogeneous reactor. It would be impracticable to provide a separate standpipe for each channel, so a number of channels have to be reached by the chute through any standpipe. It is normal for the channels to be arranged in a square lattice. Therefore, by positioning the standpipes symmetrically with respect to the lattice, the channels are disposed on circles of different radii about each standpipe so that to reach a number of channels the chute has to be mounted for turning on its axis and, also, for lateral movement of the lower end portion of the chute on a radius to said circles, thereby making it possible for the end of the chute to register with a channel. The lateral movement on a radius of the end of the chute is herein termed "radiusing."

According to the present invention the method of turning and radiusing a chute having a movable lower portion adapted to be radiused consists in providing two members rotatably mounted co-axial with said chute, one for turning said chute and the other for radiusing said movable lower portion.

According to a further feature of the invention I provide a headbox for turning and radiusing a chute of the kind having a radiusing member rotatable thereon for radiusing a movable lower portion of said chute, comprising a sleeve adapted to receive said chute, chute coupling means for coupling said sleeve to said chute, a rotatable driving member mounted in said headbox, driving member coupling means for coupling said driving member to said radiusing member and driving means for rotating said sleeve and driving member independently. The rotatable driving member may comprise a second sleeve. The driving means for turning the two sleeves may be coupled by a differential gear and the radiusing operation effected by relative movement between the two sleeves. The means for connecting the sleeves respectively to the chute and the radiusing mechanism thereof may comprise movable key means adapted to be projected radially inwards of the said sleeves for engagement and to be withdrawn clear of the bore thereof so as to enable the chute to be released and removed or inserted and engaged. The chute may require to be controlled remotely and to enable this to be done indicator means may be provided to enable the engagement of the keys and the rotational position of the sleeves to be indicated.

In order that the invention may be more clearly understood, reference is made to the accompanying drawings, wherein:

Fig. 1A is an enlarged fragmentary view of a portion of Fig. 1, showing the mounting of the radiusing sleeve on the chute head.

Fig. 1B is a horizontal section on the line 1B—1B of of Fig. 1.

Fig. 3 is an elevation of a modified form of apparatus made according to the present invention.

Fig. 4 is a plan of the headbox shown in Fig. 3.

Fig. 6 is a sectional elevation on the line 6—6 of Fig. 5, the external driving means not being shown for the sake of clearness.

Fig. 7 is a transverse section on the line 7—7 of Fig. 6, but showing part of the driving gear for one of the sleeves.

Fig. 8 is a transverse section on the line 8—8 of Fig. 6.

Figure 1:
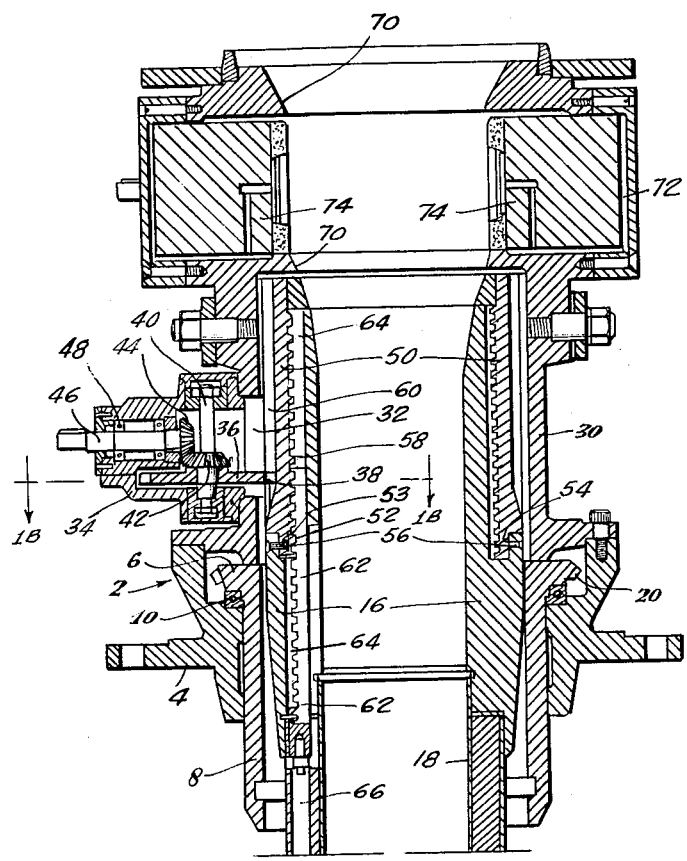
Fig. 1 is a sectional elevation of one form of apparatus made according to the present invention for a chute to be actuated within the standpipe of a heterogeneous nuclear reactor.
Figure 2:
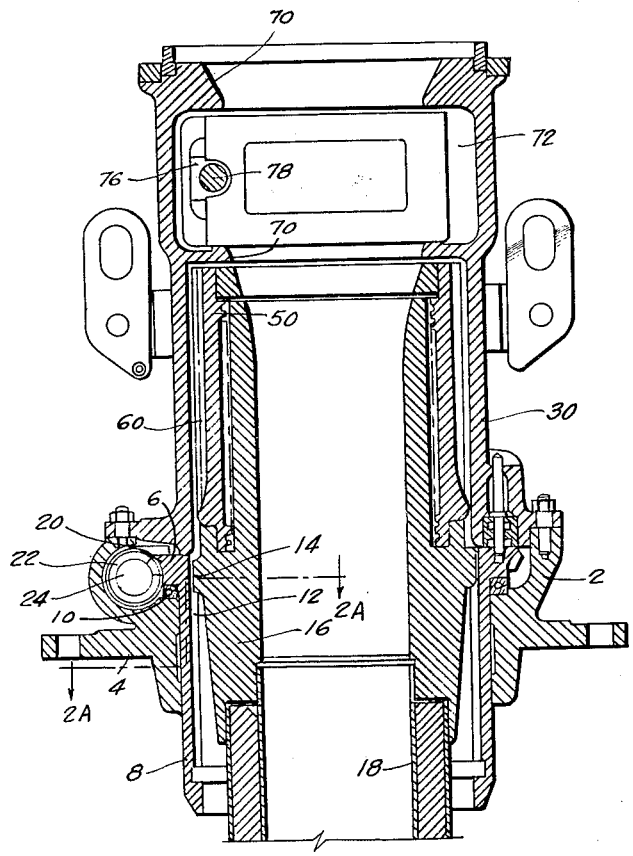
Fig. 2 is a sectional side elevation of the apparatus shown in Fig. 1.
Figure 2A:
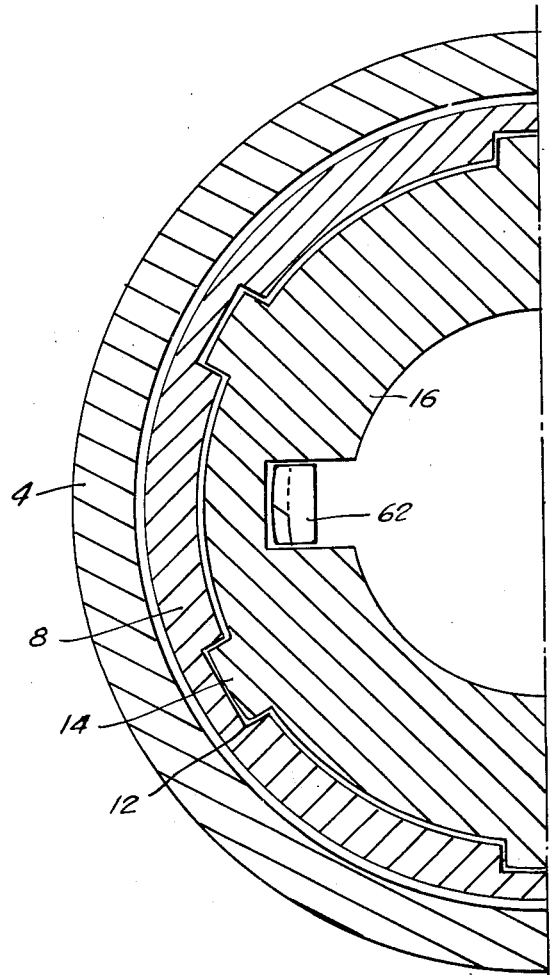
Fig. 2A is a horizontal section taken on the line 2A—2A of Fig. 2.

Referring now to Figs. 1, 1A, 1B, 2 and 2A, the headbox for turning and radiusing the chute of a heterogeneous nuclear reactor comprises a housing 2 provided with a mounting flange 4 by which the headbox is adapted to be secured to a gland box mounted on top of the standpipe (not shown) of the reactor. The housing 2 is flared at the top to receive the head 6 of a sleeve 8 extending below the housing and supported therein on bearings 10 in the housing. The sleeve 8 is provided with longitudinal spline grooves 12 (Figs. 2 and 2A) shown engaged by teeth or splines 14 on the chute head 16 of the upper part 18 of a two part chute, the lower movable part of which is not shown. The head 6 of the sleeve 8 is formed with teeth 20 (Figs. 1, 1A and 2) and constitutes a worm wheel concentric with the sleeve, which worm wheel is engaged by a worm 22 (Fig. 2) on a drive shaft 24 which is carried in journals (not shown) in the housing 2. With this arrangement, upon rotation of the sleeve 8 the chute head 16, hence the chute, is caused to rotate by means of the splined coupling between the sleeve 8 and the chute head 16. Mounted on top of the housing 2 is a valve box 30 having an aperture 32 low down to one side over which is secured a gear box 34 in which is disposed a pinion 36 the teeth 38 of which project through the aperture 32. The vertical shaft 40 of the pinion 36 carries a bevel wheel 42 which is in mesh with a bevel wheel 44 on a horizontal shaft 46 journalled in bearings 48 in the gear box 34. The shaft 46 extends outside the gear box 34 and is adapted to be coupled to suitable driving means (not shown). Mounted on the chute head 16 so as to be free to rotate thereon is a cylindrical sleeve 50 having a skirt 52 (Fig. 1A) which fits within the recessed shoulder 53 of the chute head 16 and is provided with an annular groove 54 engaged by retaining screws 56 fitted in threaded holes in the upper part of the chute head 16. The sleeve 50 is threaded internally with a steep angle, sixteen-start Acme standard thread 58 and provided on the external periphery with longitudinal teeth 60 which mesh with the pinion 36. Engaged with the thread 58 is a toothed bolt (or rack) 62 (Figs. 1, 1A and 1B) slidably mounted in a longitudinal groove 64 in the chute head 16, the toothed bolt 62 being retained against lateral disengagement from the thread 58 by being restricted to vertical longitudinal movement in its complementary groove 64 in the chute head 16. Obviously, by rotating the sleeve 50, the toothed bolt or rack 62 will reciprocate vertically by reason of its meshing engagement with the external threads 58 on the sleeve 50. The bolt 62 is coupled at its base to an operating rod 66 for actuating the movable lower end of the chute (not shown). The valve box 30 has a bore 70 of circular cross section and a horizontal bore 72 of substantially rectangular cross section in which is slidingly mounted two valve members 74 having right and left hand threaded nuts 76 engaged by a right and left hand threaded bolt 78 journalled at both ends in the valve box 30, one end extending outside thereof for the attachment thereto of actuating means.

It will thus be seen that the apparatus above described for turning and radiusing the chute comprises a first rotatable sleeve 8 rotated by operating the shaft 24 for turning the chute head 16 and with it the chute 18, and a second rotatable sleeve 50 rotated by turning the shaft 46 for actuating the bolt 62 and rod 66, the longitudinal movement of which effects radiusing by mechanism which is not described here as it forms no part of the present invention.

Figure 5:
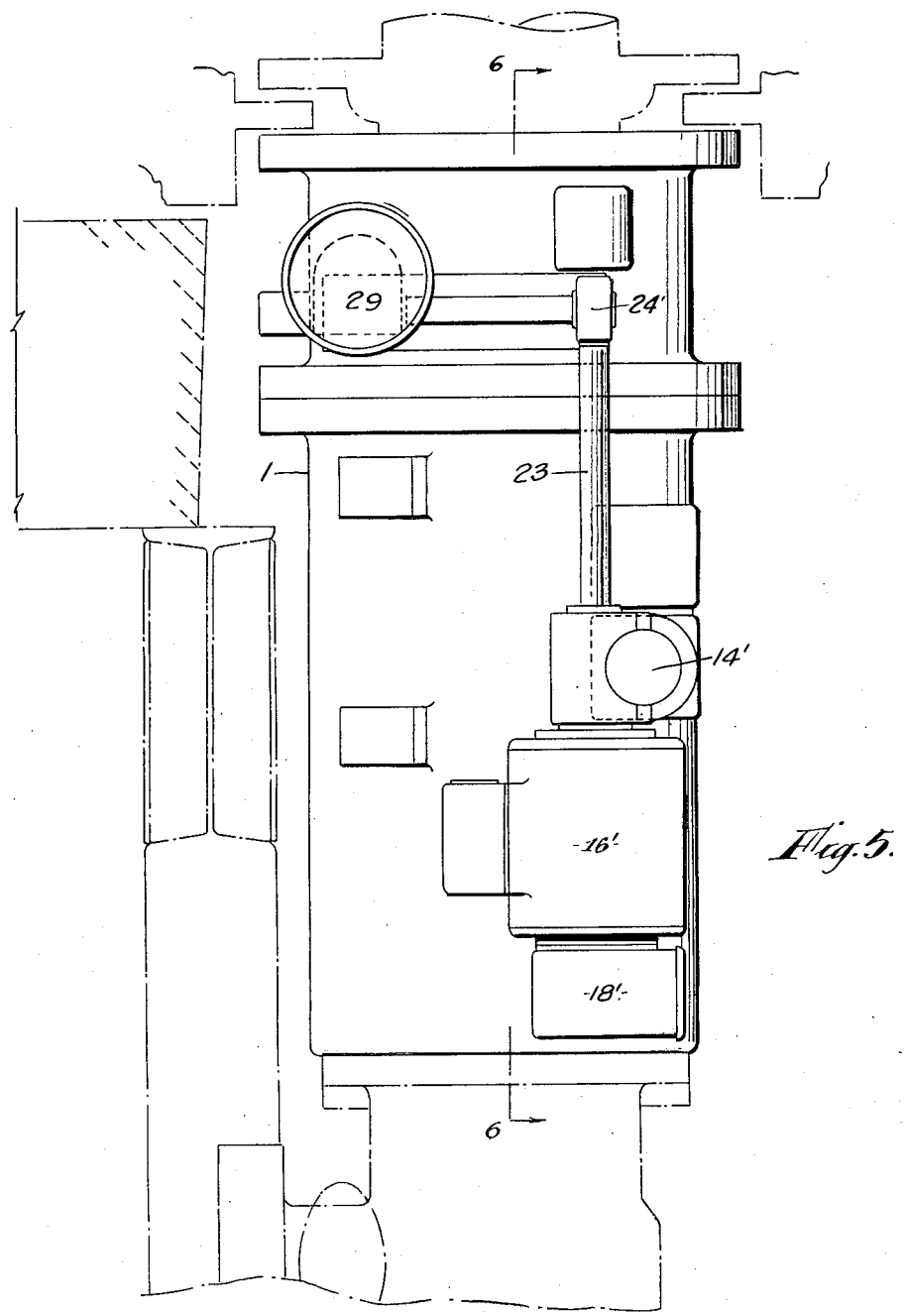
Fig. 5 is a side elevation of the apparatus shown in Fig. 3.

Turning now to Figs. 3 to 8, the headbox comprises an outer casing 1 in which there are mounted two driven sleeves, one 2' (Fig. 6) for rotating the chute and the other 3 for opening and closing the chute, i.e. radiusing. In each sleeve 2 and 3 are mounted solenoids 4' and compression springs 5 controlling the movement of the keys 6'. At the rear end of each solenoid 4' is mounted a pair of electrical contacts 7 (Fig. 8) which, being operated by the solenoids are used to indicate that the keys are engaged. As the driven sleeves 2' and 3 and, therefore, the solenoids 4' and contacts 7 revolve relative to the casing 1 the electric current for the operation of the solenoids and for the circuits of the contacts is transmitted through the sliprings 8' (Fig. 6) mounted on the sleeves through brushes (not shown) mounted on the casing 1. Each sleeve is driven by worm wheels 9 and 10' (Fig. 3) engaging with worms 11 and 12', the worms being driven in turn through primary worm reducers 13 and 14' (Fig. 3) by electric motors 15 and 16', each motor being fitted with an electro magnetic brake 17 and 18'.

Indication of the angular position of each sleeve is obtained from extension of the primary worm shafts. In the case of the chute rotation head sleeve 2' indication is obtained by extending the shaft of the motor 15 through the primary worm reducer 13 into a worm reducer 19 (Figs. 3 and 4), the worm wheel shaft 19' of which is in turn extended and coupled to a further worm reducer 21, the reductions being such that the worm wheel of the reducer 21 makes exactly the same revolutions as the sleeve 2'.

An indicator dial 20' is fitted to be driven directly by the worm wheel of 21 and therefore, indicates the rotational position of the key 6' and therefore of the chute relative to a fixed index point on the casing 1.

Also mounted on and direct driven from the worm wheel of 21 is the transmitter of a remote controlled electrically operated turn indicator such as a mag slip, the receiver and remote dial indicator being mounted on a suitable panel (not shown) in the control room.

As the radiusing of the chute is obtained by rotating the radius head sleeve 3 in relation to the rotate head sleeve 2' and both 2' and 3 are rotatable in casing 1, it follows that direct indication of the radius cannot be obtained from 3 as the actual radius is the measure of the differential movement between 2' and 3.

To obtain this indication a shaft 23 (Fig. 3) is extended from the radius motor shaft 16' and primary worm 14' to drive through worm reducers 24' and 25 to the differential 26.

The output shaft of the worm reducer 21 is extended and through bevels 27 and shaft 28 is also connected to the differential 26.

The cardan shaft of the differential 26 is connected to and drives the dial 29 indicating the radius of the chute, and also connected to the dial drive is the transmitter of a second remote controlled electrically operated turn indicator such as a mag slip, the receiver and remote indicator dial being likewise mounted in the control room.

The operation of the device shown in Figs. 3 to 8 is as follows. The chute (not shown) is lowered into position through the chute headbox until its lower end rests in the channel of the reactor. In this position the head of the chute will be located within the sleeve 2'. Whilst this is being done it will be obvious that the keys 6' must be fully withdrawn and this is ensured by the springs 5. When the chute is in position the solenoids 4' may be energised to engage the keys 6' with the keyways provided in the respective co-operating parts of the chute. Obviously some turning movement of the sleeves 2' and 3 may have to be made for engagement of the keys to take place. When the keys 6' are fully engaged this will be indicated by the indicators in the control room which will be energised by the closing of the respective contacts 7 the circuit to the indicator being completed via the slip rings 8'. The construction of the chute is not described here as it forms no part of the present invention.

When it is desired to rotate the chute, both motors 15 and 16' are energised to rotate at the same speed. This will cause the dial 20' indicating rotation to revolve while the dial 29 indicating the radius will remain stationary due to the action of the differential 26.

When it is desired to open the chute to a particular radius the radius motor 16' only is energised and, the shaft 28 remaining stationary, the Cardan shaft differential 26 revolves and so rotates the dial and transmitter indicating the radius to which the chute has been opened.

The designs shown on the drawings and described above require no particular rotary alignment between chute and headbox at insertion, it being possible to engage the drives within the head at will.

Figure 9:
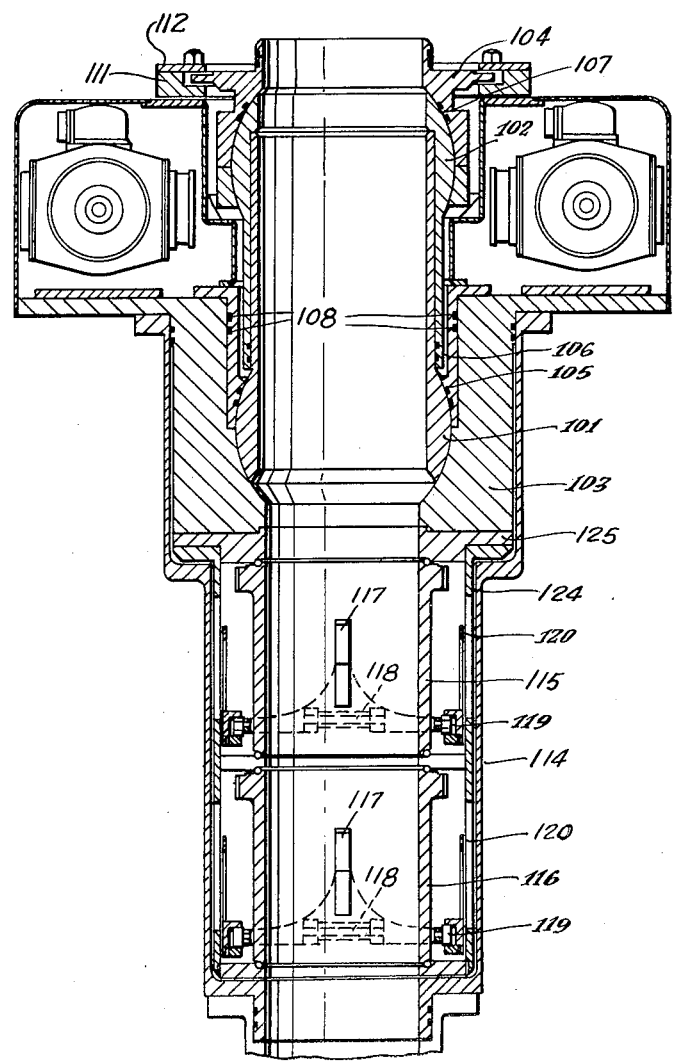
Fig. 9 is a longitudinal sectional elevation of a further modified form of headbox made in accordance with the present invention.
Figure 10:
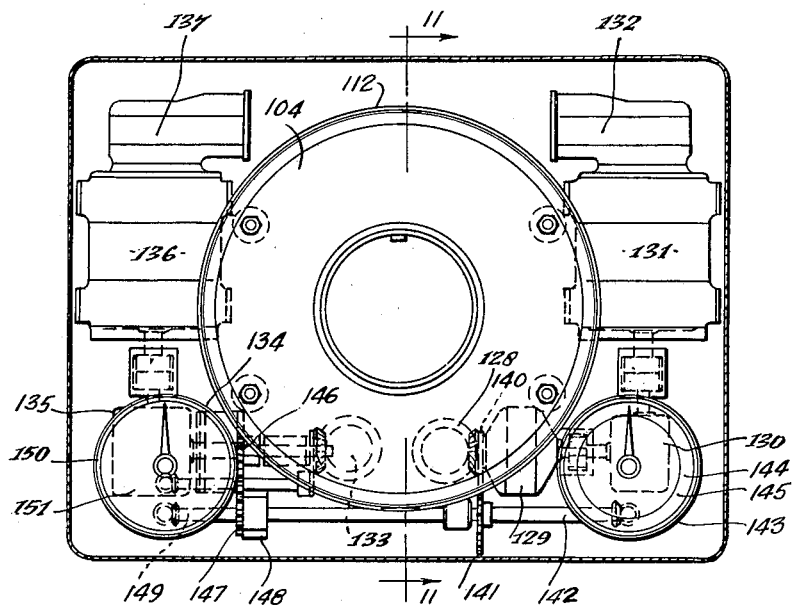
Fig. 10 is a plan view of the headbox shown in Fig. 9 with the top cover plate removed.
Figure 12:
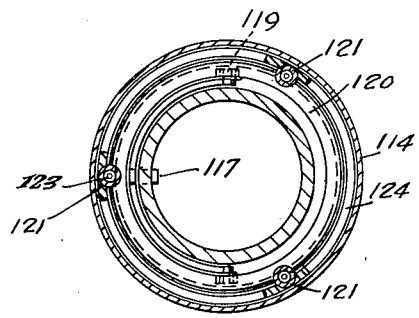
Fig. 12 is a section on the line 12—12 of Fig. 11.
Figure 11:
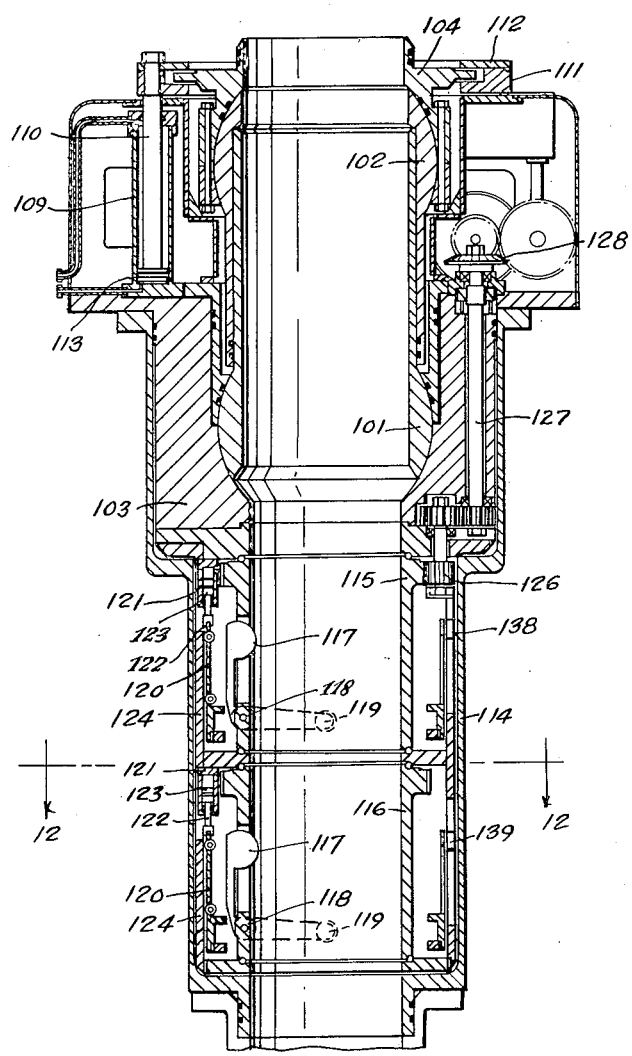
Fig. 11 is a longitudinal section on the line 11—11 of Fig. 10, which is substantially at right angles to the view seen in Fig. 9.

Referring now to Figs. 9 to 12 inclusive, the function of the chute headbox is to make it possible to operate the chute, i.e. open, close or rotate remotely at will at the same time allowing the chute to become detached or attached at will by withdrawing upwards through or lowering downwards into it.

The design shown in Figs. 9 to 12 of the drawings requires no particular rotary alignment between chute and headbox at insertion, it being possible to engage the drives within the head at will.

In this modified form the headbox comprises mechanical equipment to operate the chute and at its upper end is mounted a double-jointed spherical flexible coupling. This coupling is used to connect the top of the headbox to the underside of the charge machine and yet still allow motion of the chute headbox seated on the standpipe relative to the charge machine.

The spherical coupling comprises an inner sleeve 101 and outer sleeve 102 which are able to extend as required. The lower end of the inner sleeve is located in the flange 103 and the upper end of the outer sleeve is housed in the coupling flange 104 and this flange is used to spigot into the underside of the charge machine. Pairs of O rings 105, 106, 107 and 108 serve as gas seals on the spherical coupling.

The operation of the flexible coupling is by three equispaced carbon-dioxide operated gas cylinders 109. The upper end of the piston rod 110 is coupled to clamping rings 111 and 112 which embrace the coupling flange 104. Therefore, if a gas pressure is applied to the underside of the piston 113 the piston rod 110 will rise and carry the clamping rings 111 and 112, the coupling flange 104 and the outer sleeve 102 with it. The stroke of the jacking cylinders is sufficient to engage the coupling flange 104 in the underside of the charge machine under all conditions of pressure and temperature.

The head comprises the outer pressure casing 114 in which the chute closure flange 103, together with the flexible coupling, serves to pressure seal the top end of the casing. The lower end of the casing spigots into the standpipe. Two driven sleeves are located in the headbox, one 115 is used for rotating the chute and the other 116 for opening and closing the chute, i.e. radiusing.

Mounted on each of these sleeves is a key 117 which is pivoted at hinge 118 and which has extended arms carrying rollers 119. The rollers 119 are embraced by a split cage 120 and this cage is given vertical motion by carbon-dioxide operated cylinders 121. The connection between the cage 120 and the cylinder 121 is by piston rod 122 and piston 123. The whole of this assembly is carried in an outer cage 124 which is underslung from the flange 125 and, therefore, from the closure flange 103. Rotary motion is given to the sleeve 115 through gearing, shafts and gears 126 and 127 (Fig. 11), through bevel gearing 128, a speed reducer 129, worm reduction gear 130 and an electric motor fitted with electro-mechanical brake 131 and 132. Similarly, rotary motion is given to sleeve 116 through siimlar gearing, not shown on the drawing to avoid hiding other parts, from bevel gearing 133, and electro-magnetic clutch 134, worm reduction gear 135 and an electric motor fitted with electro-mechanical brake 136 and 137. It will be seen, therefore, that as the sleeves 115 and 116 are rotated from the motors via gearing, rollers 119 carried on the ends of the keys 117 will roll around the annulus in the cage 120 and cage 120 as well as the outer cage 124 will be stationary. If a vertical motion is now applied to the cages 120 the keys 117 may be made to pivot on their hinge 118 and thus to engage or disengage from keyways located in the charging chute.

Indication as to whether the keys 117 are engaged or disengaged from the chute is obtained by small micro switches 138 and 139 which are operated by the cages 120. These switches 138 and 139 either make or break circuits to indicator lamps situated in the control room, thereby indicating whether the keys are engaged with or disengaged from the chute.

In order that the chute may be controlled accurately, it is necessary to indicate the exact orientation of the sleeves 115 and 116 independently.

A geared drive through spur gears 140 and 141 drives a shaft 142 and through other gearing the rotate indicator box 143. The rotate indicator comprises two distinct dials, the coarse dial 144 is geared in a ratio of 1:1 with the sleeve 115 and the fine dial 145 is geared in a ratio of 36:1 to the sleeve 115. Thus it will be seen that by direct gearing, markings on the coarse dial can directly indicate orientation of the sleeve 115 and key 117 and markings on the fine dial, which rotates 36 times for 1 rotation of the coarse dial, will produce accurate indication. Also mounted in the rotate indicator box 143 are the transmitters of electrically-controlled remote indicators, the receiver and remote dial indicators being mounted in the control room.

As the radiusing of the chute is obtained by rotating a sleeve 116 in relation to the sleeve 115 and both sleeves 115 and 116 are rotatable inside the headbox, it follows that direct indication of the radius cannot be obtained from the sleeve 116 as the actual radius is the result of the differential movement between the sleeves 115 and 116. To obtain this indication, a drive is taken from the drive to the sleeve 116 via gears 146 and 147, the gear 147 driving the ringwheel of a differential gear unit 148. An extension of the shaft 142 is carried across to enter the differential unit 148 and to drive the sunwheel and the resulting differential motion is carried by shaft 149 into the radius indicator box 150. The dial 151 of the radius indicator box represents by suitable markings the motion of the chute in radiusing and the transmitter of an electrically-controlled remote indicator is driven from the indicator box 150, the receiver and remote indicator dial being mounted in the control room.

When rotating the chute, therefore, the motor 131 drives the sleeve 115 and direct indication of this is shown on the rotate indicator 143. When the rotate motor is in operation, the electro-magnetic clutch 134 is de-energised and the sleeve 116 will rotate at the same speed as the sleeve 115 and the gearing will be back-driven from the sleeve 115 back to the electro-magnetic clutch. Due to the differential mechanism 148 the radius dial will remain at zero.

When it is desired to open the chute to a particular radius, the radius motor 136 drives the sleeve 116 through the energised electro-magnetic clutch 134. The rotate motor is not energised to drive the sleeve 115 and, therefore, a differential motion will occur in the mechanism 148 and the indicator will register the relative rotational position of the sleeve 116 and key 117.

What I claim and desire to secure by letters patent is:

1. Apparatus for turning a chute about its axis and for reciprocating lengthwise of said chute a member associated with said chute, comprising a pair of axially aligned, independently rotatable sleeves adapted to receive said chute, means for coupling one of said sleeves to said chute whereby to impart rotation to said chute upon rotation of said one sleeve, and means for coupling the other of said sleeves to said member whereby to reciprocate said member upon rotation of said other sleeve relative to said one sleeve, said other sleeve being freely rotatable relative to said chute.

2. Apparatus according to claim 1, wherein the coupling means between the said one sleeve and the chute include a longitudinal spline connection between said sleeve and chute.

3. Apparatus according to claim 1, wherein the member is coupled to the chute for rotation therewith while permitting lengthwise movement relative thereto.

4. Apparatus according to claim 3, wherein the said other sleeve is rotatably mounted on the chute, and the means for coupling said other sleeve to the member to reciprocate the latter, upon rotation of said other sleeve relative to the said one sleeve, includes a threaded portion on said other sleeve engageable with a toothed portion of said member.

5. Apparatus according to claim 4, wherein the member is a toothed bolt slidably mounted on the chute for longitudinal reciprocation.

6. Apparatus according to claim 4, wherein the coupling means between the said one sleeve and the chute are slidably disengageable to permit withdrawal of the chute.

7. Apparatus according to claim 1, in which said sleeves are provided with independently drivable operating shafts, said operating shafts being coupled through differential gearing to a shaft which actuates means for indicating the relative angular position of said sleeves.

8. Apparatus according to claim 1, wherein the chute is withdrawable through said sleeves, the coupling means between the said one sleeve and the chute and between the said other sleeve and the member being disengageable to permit withdrawal of the chute.

References Cited in the file of this patent

UNITED STATES PATENTS 1,888,518    Torok et al. _____ Nov. 22, 1932